United States Patent Office 3,414,712
Patented Dec. 3, 1968

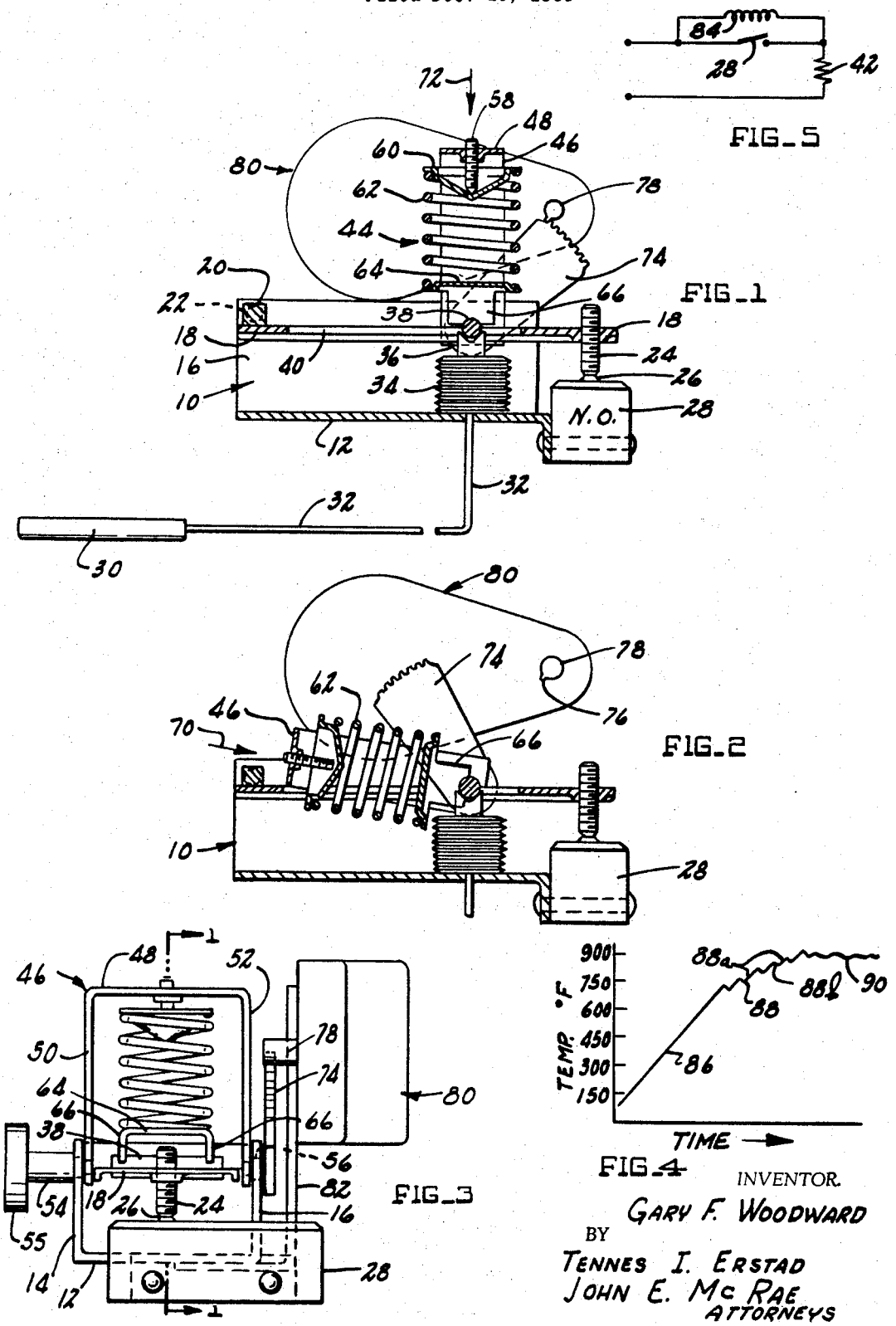

3,414,712
CONDITION CONTROL MECHANISM
Gary F. Woodward, Ann Arbor, Mich., assignor to American Standard Inc., a corporation of Delaware
Filed Dec. 15, 1965, Ser. No. 514,073
10 Claims. (Cl. 219—491)

This invention relates to condition control means as are used for example in domestic cooking ovens to control the oven temperature.

One object of the present invention is to provide a condition control means which can be used to thermostatically control a domestic cooking oven at any temperature in the normal cooking range up to 550° F., and which can also be used to thermostatically control the oven at higher temperatures in the neighborhood of 880° F. for cleaning the oven of carbon deposits formed during normal cooking operations.

A further object is to provide a condition control means which limits the rate at which the oven is heated to the 880° F. clean-off temperature, thus minimizing the possibility of cracking or chipping the porcelain wall surfaces as would be caused by differential thermal expansion due to rapid heating.

Another object is to provide a condition control means having a temperature setting adjustment spring means which can be adjusted through a wide range of settings up through 880° F. without undue manual effort on the part of the housewife or other user.

A further object is to provide a condition control means which uses a thermostatic sensing bulb charged with a safe non-poisonous fill such as nitrogen or argon, thereby avoiding potential dangers incident to the use of mercury or other poisonous fill materials.

A general object is to provide a simple low cost condition control means which is easily calibrated prior to installation in the oven or other device in which it might be used.

In the drawings:

FIG. 1 is a sectional view of one embodiment of the invention taken on line 1—1 in FIG. 3.

FIG. 2 is a sectional view in the same direction as FIG. 1 but showing certain mechanisms in different adjusted positions.

FIG. 3 is a right end view of the FIG. 1 mechanism.

FIG. 4 is a graph showing the performance characteristic of the FIG. 1 apparatus.

FIG. 5 is an electrical circuit diagram for the FIG. 1 apparatus.

As shown in FIG. 1, an appaartus of this invention includes a fixed base structure 10 of generally channel configuration, said structure having a bottom wall 12, an upstanding front wall 14, and an upstanding rear wall 16. Disposed between walls 14 and 16 is a condition control device in the form of a plate-type lever 18, said lever having a square cross section bar 20 secured thereto. Projecting from the lateral ends of bar 20 are pins 22 which extend into circular openings in walls 14 and 16 to thus mount lever 18 for pivotal movement about the pin axis.

As shown in FIG. 1, the right end of lever 18 carries a set screw 24 which engages the plunger 26 of a conventional normally open snap switch 28. Downward movement of lever 18 about the axis of pins 22 depresses plunger 26 to close the switch 28 contacts; upward movement of the lever opens the switch contacts. To develop an upward force on the lever there is provided a remote thermal bulb 30 having a capillary 32 leading to a bellows 34 which is mounted on base wall 12. The system comprising bulb 30, capillary 32 and bellows 34 is precharged with a thermally expansible gas such as nitrogen or argon having chemical stability at elevated temperatures in the neighborhood of 900° F. Bulb 30 is also preferably charged with a quantity of activated charcoal which acts as an absorbent of the gas at low temperatures, and which releases the gas to the bulb as the temperature increases. The charcoal thus increases the number of gas molecules in the system as the temperature rises, and thus produces a steeper pressure-temperature curve.

It will be understood that bulb 30 may be disposed at a suitable point within an oven to respond to oven temperature. As electric heating element 42 (FIG. 5) for the oven raises the oven temperature, bellows 34 expands upwardly and acts through notched pin 36 against a shaft 38 affixed to lever 18. Expansion of bellows 34 thus effects upward movement of control lever 18 and consequent opening of the switch 28 contacts. As the switch 28 contacts open the oven heating means t42 is de-energized, as will be seen from the circuit diagram in FIG. 5.

To close the switch 28 contacts there is provided a spring means designated generally by numeral 44 in the drawings. The spring means includes a yoke-like carrier 46 having a web wall 48, a front wall 50 and a rear wall 52, said front and rear walls being affixed to pivot pins or shafts 54 and 56 which freely extend through circular openings in the base walls 14 and 16. Pins 54 and 56 have a common axis coincident with the axis of shaft 38, but pins 54 and 56 are not connected with shaft 38. The arrangement is such that manual rotation of temperature adjustment knob 55 causes yoke 46 to turn around the shaft 38-pin 54, 56 axis without interference from lever 18. FIG. 2 shows yoke 46 in its position of maximum counter clockwise adjustment corresponding to a minimum oven temperature setting of 75° F. FIG. 1 shows yoke 46 in an upright position corresponding to a clean-off temperature setting of 880° F.

Wall 48 of carrier 46 threadedly receives a set screw 58 which engages a spring seat element 60 for a compression coil spring 62. The other end of spring 62 engages a seat element 64 which is provided with two downwardly extending arms 66. The lower edges of arms 66 have semi-circular recesses therein which cause the arms to turnably seat on the surface of shaft 38. Shaft 38 thus constitutes a fulcrum means for spring seat element 64. It will be noted that yoke 46 can be pivoted upwardly from the FIG. 2 position toward the FIG. 1 position without disturbing the relationship between spring 62 and the spring seat elements 60 and 64.

In the FIG. 2 position spring 62 exerts a restraining force on shaft 38 along the line of action designated by arrow 70. This line of action is substantially horizontal and has but a very small vertical force component acting downwardly on shaft 38. Thus, with yoke 46 in the FIG. 2 position there is a very small effective restraining force developed by spring 62 in opposition to the upwardly acting work force potentially available from bellows 34. Consequently a low oven temperature on the order of 100° F. may be sufficient to develop a gas pressure in bulb 30 which drives bellows 34 upwardly the slight distance necessary to open the switch 28 contacts. Opening the contacts de-energizes heater 42 and permits the oven to cool slightly. As the oven cools the bulb 30 charge experiences a lowering pressure which enables spring 62 to move control lever 18 downwardly to close switch 28 contacts. Thus, lever 18 is caused to cycle upwardly and downwardly a few thousandths of an inch to control the oven temperature within a few degrees of the temperature setting dictated by the position of yoke 46.

The rotated position of yoke 46 determines the vertical force component exerted by spring 62 on shaft 38 and thus the temperature attained in the oven. The illustrated control can be calibrated so that a yoke 46 position at about eleven o'clock produces an oven temperature of about 550° F. Positions between nine o'clock and eleven o'clock provide the normal baking range up to 550° F.

When yoke 46 is moved to the FIG. 1 twelve o'clock position spring 62 then has a line of action designated by arrow 72. This is the position of maximum spring restraining force, requiring a bulb temperature of about 880° F. to open the switch 28 contacts. Preferably movement of yoke 46 from the eleven o'clock position to the twelve o'clock position is accomplished slowly to prevent a too rapid increase in the oven temperature.

If knob 55 were turned in a single quick motion to the FIG. 1 position spring 62 would immediately exert a maximum vertical force component on control lever 40, and heater 42 would remain continually energized until the oven temperature had reached a clean-off temperature (880° F.) sufficient to produce the expansion of bellows 34 necessary to open switch 28. Such a continuous energization of the heater would subject the oven walls to differential thermal expansion, and would promote cracking or chipping of the porcelain coating on such walls. Therefore in the 700° to 880° temperature range the illustrated control mechanism is designed to energize the heater in spaced stages which in effect decreases the rate at which the oven walls are heated; the wall temperatures are thus more nearly equalized to minimize thermal expansion effects.

Stub shaft 56 of the illustrated mechanism carries a gear segment which registers with the single tooth 76 on the output shaft 78 of an electrical motor 80. The motor may be mounted in a stationary position, as by means of bracket 82 (FIG. 3). In order to clearly show other mechanisms the motor bracket is omitted in FIGS. 1 and 2. Motor 80 is a conventional motor structure having a motor winding 84 (FIG. 5) and self-contained speed reducer gears (not shown) which may provide an output gear speed on the order of one half revolution per minute.

Referring to FIG. 5, the motor winding may be connected with switch 28 and in series with electrical oven heater 42. When switch 28 is closed the high resistance motor winding receives substantially no current, the entire current then being effective for oven heating purposes. When switch 28 is open the motor winding is energized to provide movement of gear 78. The resistance of winding 84 is many times higher than that of heater 42; therefore when winding 84 is energized the current is so reduced that heater 42 has substantially no heat output.

To establish the higher oven temperature setting of 880° F. the user turns knob 55 clockwise until the rightmost tooth on gear segment 74 engages tooth 76. As the knob is turned spring 62 moves lever 40 downward to close switch 28. Heater 42 then heats the oven until bellows 34 develops sufficient work force to open switch 28. As switch 28 opens, motor winding 84 is energized to produce clockwise movement of shaft 78. This further turns yoke 46 a slight distance toward the FIG. 1 twelve o'clock position, thus causing spring 62 to exert an increased vertical force component on lever 40. The lever is thus forced downwardly to close switch 28 to again energize heater 42 and de-energize motor winding 84.

The alternate energization of heater 42 and motor winding 84 continues throughout the heating operation. During the initial stages the oven is heated in steps to the various temperature settings established by the motor-induced rotation of gear segment 74. When the FIG. 1 position is reached the motor can no longer drive segment 74 rightwardly to establish a new temperature setting. The oven then follows the established setting. This can be calibrated to be 880° F. or any other temperature deemed appropriate for oven cleaning purposes.

FIG. 4 shows the general character of the heating operation during and preparatory to the clean-off process. Line 86 represents the heating action produced by manual movement of knob 55 up beyond the eleven o'clock position of yoke 46 (about 700° F.). The jagged line 88 represents the heating action while gear 74 is being incrementally advanced by tooth 76 to the FIG. 1 position. Line 90 represents the heating action after the FIG. 1 position is reached. Line segments 88a show the action of heater 42 as it attempts to satisfy the setting previously established by the motor; line segments 88b show the cooling action experienced in the oven while the heater is de-energized and the motor is establishing a new temperature setting.

Calibration of the mechanism is preferably accomplished in two separate operations. First, yoke 46 may be turned to the FIG. 1 position. Bulb 30 may then be subjected to the 880° F. control temperature, and screw 58 turned to just close or just open the contacts; this calibrates the control for the clean-off temperature setting. Second, the bulb may be subjected to a lower temperature such as 375° F., and yoke 46 turned counter clockwise until switch 28 is actuated; markings on knob 55 can then be correlated with a surrounding dial plate (not shown) to provide a visual temperature setting reference. To provide increased knob movement the knob may be associated with a cam engaged with the yoke; thus the knob would rotate the cam through two hundred seventy degrees, and the cam would in turn effect the desired yoke 46 rotation.

The illustrated mechanism achieves a range of temperature settings by changing the line of action of spring 62. Comparatively slight force is required on knob 55 or yoke 46 to accomplish the turning action. Thus, the turning resistance consists only in bearing friction at shafts 54, 56 and 38. The arrangement permits spring 62 to have the same loading at all temperature settings, which is in contrast to conventional arrangements where different settings are accomplished by varying the loading. Such variable loading arrangements might be impractical over temperature ranges up to 900° F. because of excessive manual force requirements.

As previously noted, the preferred charge for bulb 30 is harmless nitrogen or argon plus gas-absorbing charcoal. The charcoal has an absorbing characteristic which varies inversely with temperature; at higher temperatures the charcoal releases gas molecules to the bulb system for thus providing a steeper pressure-temperature curve than would otherwise be possible. The curve is substantially a straight line curve.

The drawings show an electrical motor for advancing yoke 46 during the latter stages of its movement to the FIG. 1 position. Other electrical power devices could however be used. For example, an electrically heated bi-metal (flat or spiral) could be used to drive yoke 46 through a ratchet or possibly by direct drive. Another usable power device is a conventional wax-charged power element having a heater winding associated therewith for expanding the wax against a movable piston.

The illustrated motor 80 is advantageous in that its gear 78 can be driven at a fairly low speed on the order of one half r.p.m. By providing but one tooth on gear 78 the yoke 46 movement can be further reduced to thus provide a desirably slow heating of the oven as it nears the clean-off temperature.

Variations from the illustrated structural arrangement can be resorted to while still practicing the invention as defined by the appended claims.

I claim:

1. In combination, a condition responsive power means operable to develop a first graduated work force; spring means operable to develop a restraining force opposing the work force; a condition control device movable by the resultant of the work force and restraining force to prevent the condition from straying appreciably from a preselected setting; and means for varying the value of the restraining force to thus vary the condition setting; said varying means including mechanism for changing the line of action of the spring means relative to the line of action of the power means.

2. The combination of claim 1 wherein the condition responsive power means comprises a thermal bulb remote from the control device, an expansible chamber means mechanically engaged with the control device, capillary tubing interconnecting the bulb and chamber means, and thermal expansion material filling the system defined by the bulb, tubing and chamber means.

3. The combination of claim 2 wherein the bulb is charged with gas absorbent charcoal and a thermal expansion material selected from nitrogen and argon.

4. The combination of claim 1 wherein the means for changing the line of action of the spring means includes an electrical power advancement means; the combination further comprising switch means operable by the control device to energize the advancement means after the control device has adjusted the condition to a setting previously dictated by said advancement means.

5. The combination of claim 1 wherein the spring means comprises a coil spring having one end thereof fulcrummed about a point on the control device and the other end thereof fulcrummed about a fixed point; the two fulcrum points being in substantial alignment with one another to form a common fulcrum axis.

6. The combination of claim 1 wherein the means for varying the restraining force comprises a manual means operably effective on the spring means over a first range of condition settings, and an electrical power means operably effective on the spring means over a second range of condition settings.

7. The combination of claim 1 and further comprising an oven heating means, a switch for energizing the heating means, and means carried by the aforementioned control device for operating the switch.

8. The combination of claim 1 wherein said spring means includes a pivotal yoke, a coil spring confined within the yoke, and a calibration screw carried by the yoke and operable to vary the loading on the spring means while said spring means is held in a given line-of-action position.

9. The combination of claim 1 wherein the mechanism for changing the line of action of the spring means includes a stationary electrical motor having an output shaft equipped with a single gear tooth, and a gear segment movable with the spring means to engage the tooth, whereby motor movement produces reduced speed movement of the gear segment and associated spring means.

10. The combination of claim 1 wherein the power means develops a work force in response to increasing oven temperatures; said control device taking the form of a lever having a single fulcrum means engaged with the spring means and power means; said spring means comprising a coil spring and a confining yoke which is fulcrummed for movement about a stationary point in substantial alignment with the aforementioned fulcrum means; said mechanism for varying the line of action of the spring means including a manual actuator shaft connected with the yoke for turning same about the stationary point to establish normal oven baking temperature settings, a stationary electrical motor having an output gear, and a gear segment movable with the yoke into mesh with the output gear when the actuator shaft is turned through a predetermined arc beyond its normal temperature setting positions; the combination further comprising an oven heating means and a switch operable by movement of the lever, said switch being effective to alternately energize the motor and heating means so that the motor establishes successively higher temperature settings while the gear segment and output gear are in mesh with one another.

References Cited

UNITED STATES PATENTS 2,611,850   9/1952   Walton _____ 219—511

FOREIGN PATENTS 728,198   4/1955   Great Britain.

BERNARD A. GILHEANY, *Primary Examiner.*

FRED E. BELL, *Assistant Examiner.*